United States Patent [19]

Vezzani

[11] Patent Number: 5,033,374
[45] Date of Patent: Jul. 23, 1991

[54] MACHINE FOR COMPACTING AND CUTTING RESIDUAL MATERIAL, IN PARTICULAR FOR SCRAP METAL

[76] Inventor: Roberto Vezzani, Via Nuova Costa 13 - 15076, Ovada, Italy

[21] Appl. No.: 503,018

[22] Filed: Apr. 2, 1990

[30] Foreign Application Priority Data

Apr. 10, 1989 [IT] Italy .................. 20079 A/89

[51] Int. Cl.⁵ .............................................. B30B 9/00
[52] U.S. Cl. ........................................ 100/95; 83/923; 100/98 R; 100/215; 100/233
[58] Field of Search .................. 100/39, 42, 94, 95, 100/98 R, 215, 232, 233, 236, 237, 901; 83/923

[56] References Cited

U.S. PATENT DOCUMENTS

| | | |
|---|---|---|
| 1,812,797 | 6/1931 | Lindeman .................. 100/215 X |
| 3,101,045 | 8/1963 | Van Endert .................. 100/233 |
| 3,124,062 | 3/1964 | Thompson .................. 100/215 |
| 3,545,369 | 12/1970 | Tokushima .................. 100/233 X |
| 4,253,388 | 3/1981 | Vezzani .................. 100/39 |
| 4,369,700 | 1/1983 | Flagg .................. 100/233 X |
| 4,552,062 | 11/1985 | Vezzani .................. 100/95 |

FOREIGN PATENT DOCUMENTS 1938150 2/1971 Fed. Rep. of Germany ...... 100/215
2324073 5/1974 Fed. Rep. of Germany ...... 100/233

Primary Examiner—Harvey C. Hornsby
Assistant Examiner—Stephen F. Gerrity
Attorney, Agent, or Firm—Guido Modiano; Albert Josif

[57] ABSTRACT

The machine has a containment box which holds the material to be compacted. The material is advanced through the containment box by a pivoted inlet wall of the containment box which is acted upon by a fluid actuated cylinder. Two compaction stations are arranged in series inside the containment box to achieve two successive compactions of the material. Each compaction station has an L-shaped presser element which is provided to the containment box and which oscillates under the action of a fluid actuated cylinder. The L-shaped presser element oscillates between a non-working position, and a working position in which the volume inside the compaction station is decreased to compact the material. Guillotine shears are arranged after the compaction stations to cut the compacted material.

9 Claims, 2 Drawing Sheets

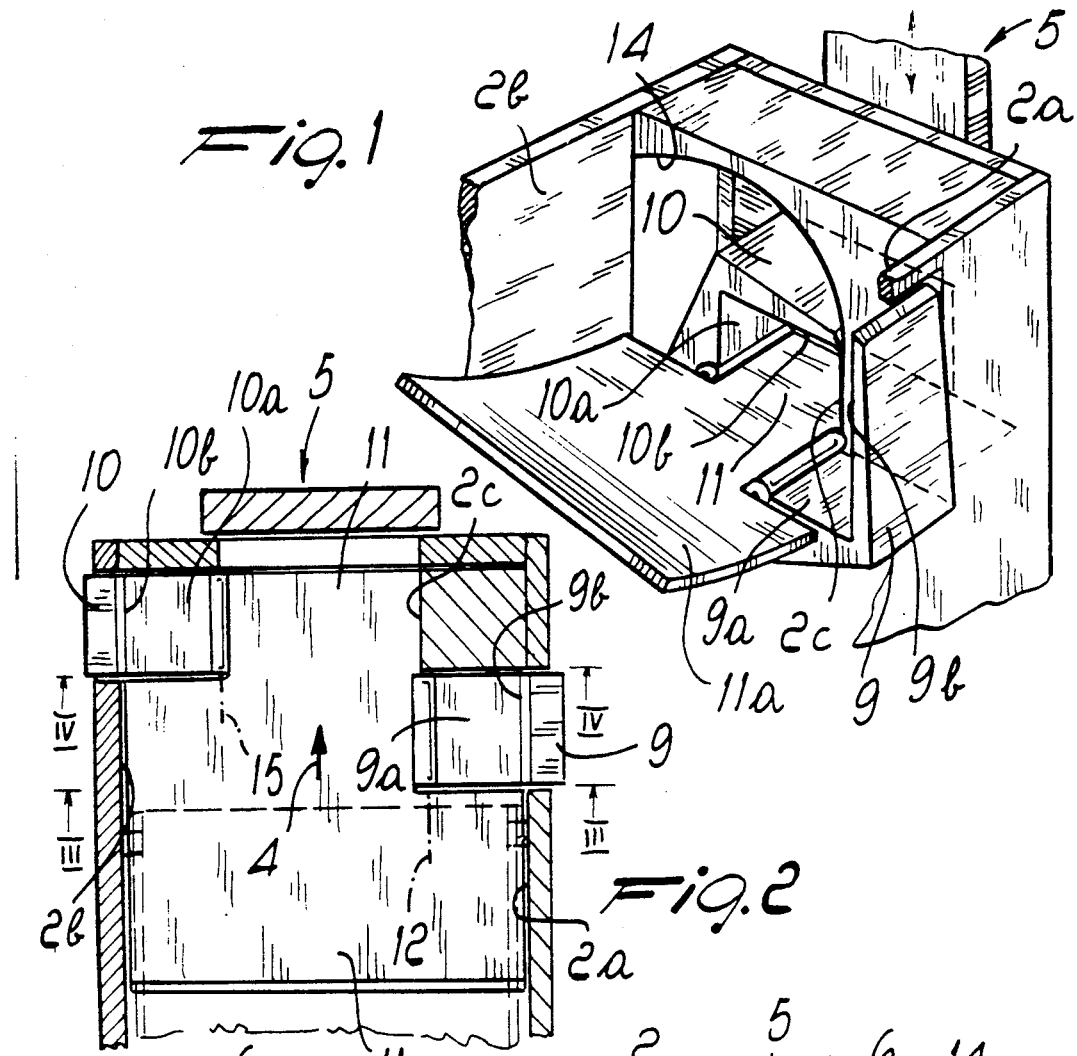
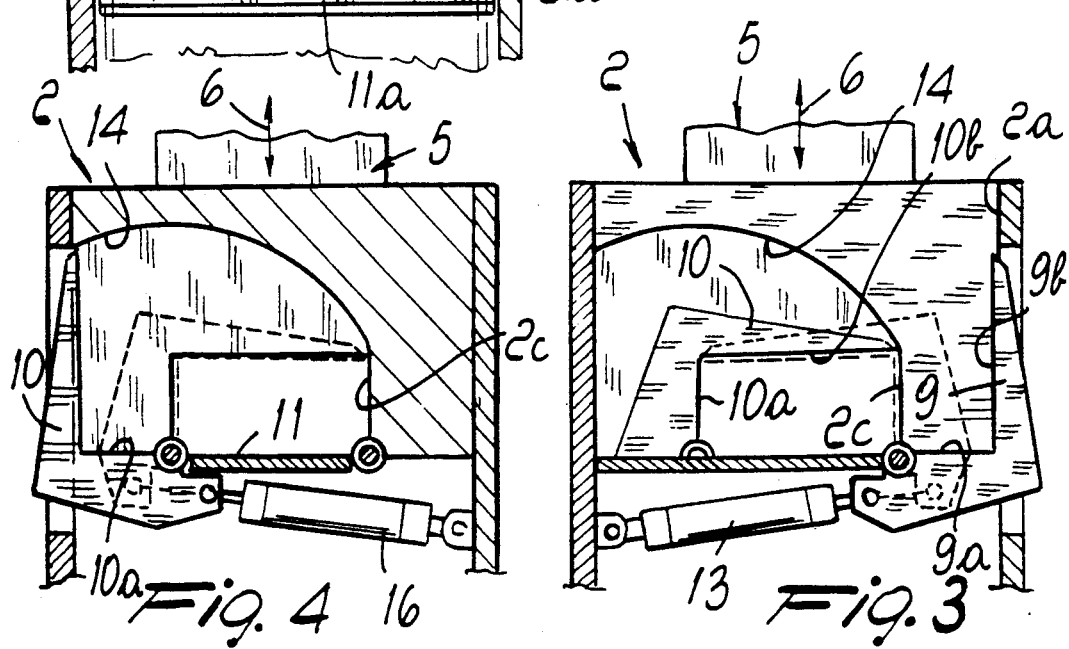

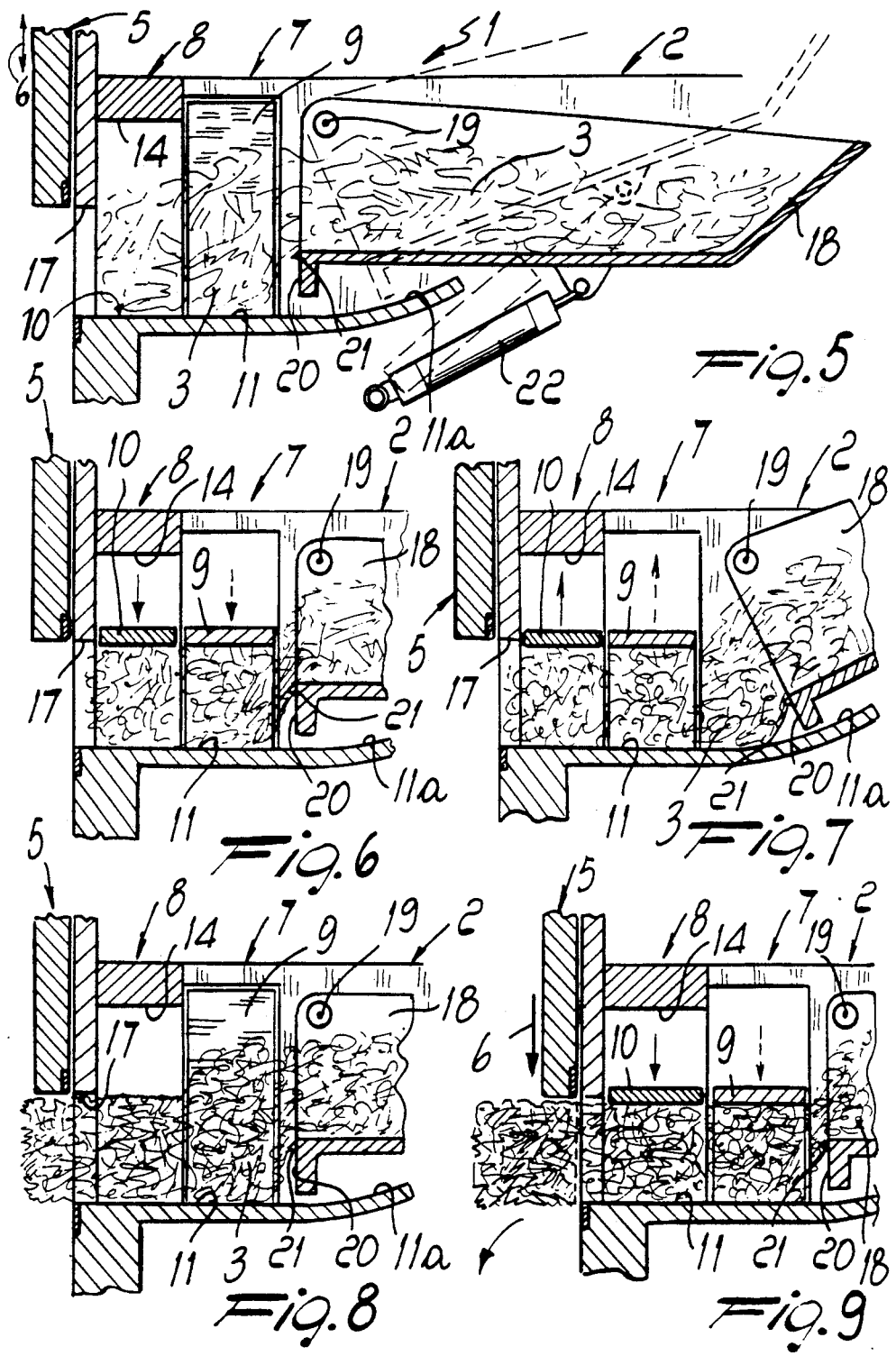

MACHINE FOR COMPACTING AND CUTTING RESIDUAL MATERIAL, IN PARTICULAR FOR SCRAP METAL

BACKGROUND OF THE INVENTION

The present invention relates to a machine for compacting and cutting residual material, in particular for scrap metal.

Scrap compacting and cutting machines are known which generally comprise a containment box for the material to be compacted having appropriate means for the advancement of the material toward cutting means usually consisting of guillotine or scissor shears. The containment box, which generally has a horizontally arranged substantially parallelepipedal configuration, is provided with means for compacting the material so as to obtain for the scrap, which is intrinsically non-uniform and bulky, the required density before it undergoes the cutting action of the shears.

In known machines the material is compacted by means of one or more devices which act in sequence on the material, affecting, for each sequence, a volume of material which corresponds to the lengthwise extension of the containment box, i.e. to its extension in a direction parallel to the direction of advancement of the material. After the material has been compacted and has assumed the configuration of a long parallelepiped, it is pushed so as to advance with intermittent motion through the cutting inlet of the shears by means of a longitudinal pusher which is generally actuated by means of a fluid actuated cylinder.

Due to the fact that the compaction affects large surfaces of material and requires considerable forces, such known types of machines have heavy and expensive structures. Furthermore, the longitudinal advancement of the compacted material, performed by means of a fluid actuated cylinder with a considerable stroke, also significantly affects the production costs of these machines.

In other kinds of machines, the material is compacted in a limited region of the material containment box, in a transverse direction with respect to its advancement, immediately upstream of the shears. Simultaneously with the compacting action performed by the presser element, a movable wall pivoted to said presser element provides a progressive compression of the material along the entire containment box. The advancement motion of the material toward the cutting inlet of the shears is obtained by gravity, by virtue of the fact that the containment box is appropriately inclined in these machines.

Though they partially solve the problems of the preceding machines, even these known types of machine have some disadvantages, mainly due to the inclined arrangement of the containment box which is penalizing from the point of view of installation. The inclined arrangement in fact implies considerable loading heights for the material and an excessively low expulsion thereof after cutting, with expensive lifting installations. Movable machines of this kind are furthermore troublesome to provide.

Another disadvantage is that heavy structures for the containment and compression of the material are in any case required; said structures are linked to the use of the movable wall which acts substantially on the entire length of the containment box.

SUMMARY OF THE INVENTION

The aim of the present invention is to obviate the above described disadvantages by providing a machine for compacting and cutting residual material which has modest production and installation costs with respect to known machines.

Within the scope of this aim, an object of the invention is to provide a machine which has, for an equal performance, a considerably lightened structure with respect to conventional machines.

Another object of the invention is to provide a machine in which it is possible to adjust the working cycle according to the kind of material to be compacted.

This aim, these objects and others which will become apparent hereinafter are achieved by a machine for compacting and cutting residual material, in particular scrap metal, which comprises a containment box for the material to be compacted, means for advancing the material to be compacted along a feed direction and means for cutting the compacted material which act along a transverse direction with respect to said feed direction, material compacting means being arranged upstream of said cutting means according to the direction of advancement of the material along said feed direction, characterized in that said material compacting means comprise at least two compaction stations which are arranged in succession along said feed direction, each station affecting a portion of the extension of said containment box parallel to said feed direction, said compaction stations comprising presser elements which can be controllably actuated and act in sequence on portions of the volume of material contained in said containment box for the progressive compaction of said portions in their advancement motion toward said cutting means.

BRIEF DESCRIPTION OF THE DRAWINGS

Further characteristics and advantages of the invention will become apparent from the description of a preferred but not exclusive embodiment of the machine according to the invention, illustrated only by way of non-limitative example in the accompanying drawings, wherein:

FIG. 1 is a schematic perspective view of a portion of the machine proximate to the compaction stations;

FIG. 2 is a partially sectional top plan view of the machine portion illustrated in FIG. 1;

FIG. 3 is a sectional view of FIG. 2, taken along the axis III—III, illustrating the operation of the presser elements;

FIG. 4 is a sectional view of FIG. 2, taken along the axis IV—IV, illustrating the operation of the presser elements;

FIG. 5 is a schematic sectional view, taken along a vertical plane, of the machine according to the invention;

FIGS. 6 to 9 are sectional views, taken similarly to FIG. 5, of the operation of the machine according to the invention.

DESCRIPTION OF THE PREFERRED EMBODIMENTS

With reference to the above figures, the machine according to the invention, generally indicated by the reference numeral 1, comprises: a containment box 2 for the material 3 to be compacted, means for the advancement of the material along a feed direction, indicated by an arrow 4 in FIG. 2, and means 5 for cutting the compacted material which act along a direction 6 which is transverse to the feed direction 4. Means for compacting the material are provided upstream of the cutting means 5 according to the direction of advancement of the material along the feed direction 4.

According to the invention, the compaction means comprise at least two compaction stations 7 and 8 which are arranged in succession along the feed direction 4; each station affects a portion of the extension of the containment box 2 in a direction which is parallel to the direction 4. Controllably actuatable presser elements 9 and 10 are arranged in the compaction stations 7 and 8 and act in sequence on portions of the volume of material 3 contained in the containment box 2 so as to perform a progressive compaction of portions of the material 3 in its motion of advancement toward the cutting means 5.

The containment box 2 has, at least proximate to the compaction stations 7 and 8, a substantially parallelepipedal configuration with the back or bottom wall 11 arranged in a horizontal plane.

The first compaction station 7 comprises a first presser element 9 constituted by an arm which is pivoted with one of its ends proximate to the bottom wall 11 with a pivoting axis 12 which is substantially parallel to the direction 4. Said arm 9 has, in a plane which is perpendicular to the direction 4, a substantially L-shaped configuration with a first face 9a and a second face 9b which are directed toward the inside of the containment box 2 and are substantially perpendicular to one another.

A first fluid actuated cylinder 13 acts on the arm 9 and causes the oscillation thereof about the pivoting axis 12 from an idle position, in which the face 9a is substantially co-planar to the bottom wall 11 and the face 9b is co-planar to a wall 2a of the two side walls 2a and 2b of the containment box 2, to an operative position, in which the face 9a is parallel to, but spaced inward with respect to, the side wall 2a of the containment box whereas the face 9b is arranged parallel to and above the bottom wall 11.

In passing from the idle position to the operative position, the arm 9 performs an oscillation of substantially 90°, reducing on one side and above the volume available for the material inside the containment box 2 at the first compaction station 7.

At the second compaction station 8 the containment box 2 has an upper curved wall 14 and a side wall 2c which is parallel to the wall 2a and is substantially co-planar to the face 9a of the arm 9 when said arm is in operative position.

The second compaction station 8 comprises a second presser element 10 which is opposite to the wall 2c and is constituted by an arm which is pivoted with one of its ends proximate to the bottom wall 11 with a pivoting axis 15 which is substantially parallel to the direction 4. Similarly to the arm 9, the arm 10 has, in a plane which is perpendicular to the direction 4, a substantially L-shaped configuration with a first face 10a and a second face 10b which are directed toward the inside of the containment box 2 and are mutually perpendicular.

A second fluid actuated cylinder 16 acts on the arm 10 and causes the oscillation thereof substantially through 90° about the pivoting axis 15 from an idle position, in which the face 10a is substantially co planar to the bottom wall 11 and the face 9b is co-planar to the wall 2b of the containment box 2, to an operative position, in which the face 10a is parallel to, but spaced inward with respect to, the face 2b of the containment box, whereas the face 10b is arranged parallel to and above the bottom wall 11.

In passing from the idle position to the operative position, the arm 10 oscillates in the opposite direction with respect to the arm 9 and slides with its free end along the upper wall 14 of the containment box, reducing, on the side opposite to the one delimited by the wall 2c, the volume available to the material inside the containment box 2 at the second compaction station 8.

The dimensions of the arms 9 and 10 are such that at the exit from the second compaction station the volume of compacted material has, in a transverse cross section with respect to the direction 4, a smaller bulk than the cutting inlet 17 arranged at the end of the containment box 2, so that the compacted material can easily pass through said inlet even in the presence of elastic expansion of the material.

The means for the advancement of the material are advantageously constituted by a pivoting portion 18 of the containment box 2 which is arranged upstream of the compaction stations 7 and 8 and is pivoted, with an upper portion, to the remaining part of the containment box with a pivoting axis 19 arranged transversely to the direction 4. A fluid actuated cylinder 22 acts on the portion 18 and causes its oscillation about the axis 19 from a raised position, in which the bottom of the portion 18 is inclined with respect to the bottom wall 11 to obtain the gravity feed of the material, to a lowered position, in which the bottom of the portion 18 is substantially parallel to the bottom wall 11, and vice versa, so as to cause the intermittent advancement of the material toward the cutting means 5.

The portion 18 has, on its side directed toward the compaction stations 7 and 8, a lip 20 which protrudes downward and slides along a curved portion 11a of the bottom wall 11 of the remaining part of the containment box 2. Said lip 20 defines a shoulder which performs an intermittent pushing effect on the material when the portion 18 passes from the raised position to the lowered position.

Biting elements 21, such as points or the like, can be conveniently provided on the shoulder defined by the lip 20 and prevent the return of the material toward the portion 18, improving the advancement of the material toward the compaction stations 7 and 8.

The stroke of the fluid actuated cylinder 22, which causes the oscillation of the portion 18, is correlated to the dimensions of the compaction stations 7 and 8 and is adjustable in a known manner according to the kind of material to be compacted.

The cutting means 5 are constituted by known guillotine shears arranged immediately after the cutting inlet 17.

The operation of the machine according to the invention is as follows.

By means of the oscillation of the portion 18, the material 3 is fed to the compaction stations 7 and 8 while the arms 9 and 10 are in their idle position. The actuation of the fluid actuated cylinders 13 and 16 moves the arms 9 and 10 to their operative position, causing the compaction of the material which is in the compaction stations 7 and 8. At this point the portion 18 is moved to the raised position by means of the cylinder 22 and before it returns to its lowered position the arms 9 and 10 are returned to their idle position so that the passage of the portion 18 from the raised position to the lowered position causes an advancement which is smaller than, or equal to, the one which corresponds to a compaction station.

At this point, the arms 9 and 10 are returned to their operative position so that the arm 10 further compresses the portion of material which has already been subjected to the action of the arm 9 while said arm 9 compacts a new portion of material.

In the meantime, the advancement of the material has moved a first portion of material beyond the cutting inlet 17, and this portion is sheared by the cutting means 5 which are actuated while the arms 9 and 10 are in their operative position.

Again while the arms 9 and 10 are in their operative position, the portion 18 is returned to the raised position and the cycle continues as already described.

In practice it has been observed that the machine according to the invention fully achieves the intended aim, since by virtue of the fact that the compaction of the material occurs in a limited region proximate to the cutting inlet, reduced actuation forces are required and only this region requires appropriate characteristics of structural strength, whereas the remaining part of the box can be configured exclusively for the containment of the material, with a consequent reduction in production and installation costs for the machine with respect to conventional machines.

Another advantage is that it is possible to adjust the feed so as to have a greater or smaller concentration of material in the compaction and cutting region according to the kind of material to be treated.

The machine thus conceived is susceptible to numerous modifications and variations, all of which are within the scope of the inventive concept; all the details may furthermore be replaced with technically equivalent elements.

In practice, the materials employed, as well as the dimensions, may be any according to the requirements and the state of the art.

I claim:

1. Machine for compacting and cutting residual material, in particular for scrap metal, comprising: a containment box for the material to be compacted, means for advancing the material to be compacted along a feed direction and means for cutting the compacted material which act along a transverse direction with respect to said feed direction, material compacting means being arranged upstream of said cutting means according to the direction of advancement of the material along said feed direction, wherein said material compacting means comprise at least two compaction stations which are arranged in succession along said feed direction, each station affecting a portion of the extension of said containment box parallel to said feed direction, said compaction stations comprising presser elements which can be controllably actuated and act in sequence on portions of the volume of material contained in said containment box for the progressive compaction of said portions in their motion of advancement toward said cutting means, wherein said advancement means comprise a pivoting portion of said containment box which is arranged upstream of said compaction stations along the direction of advancement of the material, said containment box comprising in addition to said pivoting portion a remaining part, said pivoting portion of said containment box being controllably oscillable with respect to said remaining part of the containment box with a reciprocating motion about an axis arranged transversely to said feed direction for the intermittent advancement of the material toward said cutting means, and wherein said pivoting portion of said containment box has, on its side which is directed toward said compaction stations, a lip, said remaining part of said containment box defining a curved portion, said lip being slidable along said curved portion, said lip defining a shoulder for pushing the material toward said compaction stations.

2. Machine according to claim 1, wherein biting elements are provided on said shoulder.

3. Machine for compacting and cutting residual material, in particular for scrap metal, comprising:
   containment box means for the material to be compacted, said containment box means defining a longitudinal extension corresponding to a material feed direction along which the material is advanced,
   material advancement means for advancing the material in said containment box means along said material feed direction,
   material compacting means for compacting the material in said containment box means,
   material cutting means for cutting the compacted material, said material cutting means acting along a transverse direction with respect to said material feed direction, said material cutting means being arranged downstream from said material compacting means with respect to said material feed direction,
   a cutting inlet being defined between said material cutting means and said material compacting means through which compacted material advances from said material compacting means to said material cutting means,
wherein said material compacting means comprise at least two material compaction stations being arranged in succession along said longitudinal extension of said containment box means, said at least two material compaction stations comprising a first material compaction station and a second material compaction station, said first material compaction station being arranged upstream of said second material compaction station with respect to said material feed direction, said first material compaction station comprising a first presser element, said second material compaction station comprising a second presser element, said first presser element comprising a first pivoting arm defining a first arm first face and a first arm second face, said second presser element comprising a second pivoting arm defining a second arm first face and a second arm second face, said containment box means comprising a first side wall means, a second side wall means, and a bottom wall means, said first side wall means and said second side wall means being arranged mutually opposite to each other and said bottom wall means extending and being connected therebetween, said first pivoting arm defining a free end being pivoted around a first pivoting axis which is substantially coplanar to said bottom wall means of said containment box means and which is substantially parallel to said material feed direction, said second pivoting arm defining a free end being pivoted around a second pivoting axis which is substantially coplanar to said bottom wall means of said containment box means and which is substantially parallel to said material feed direction, said machine further comprising first fluid-actuated cylinder means for rotating said first pivoting arm around said first pivoting axis between an idle position, in which said first arm first face defines a portion of said bottom wall mans and said first arm second face defines a portion of said first side wall means, and an operative position, in which said first pivoting arm is rotated substantially 90 degrees inside said containment box means at said first material compaction station from said first pivoting arm idle position, said machine further comprising second fluid-actuated cylinder means for rotating said second pivoting arm around said second pivoting axis between an aidle position, in which said second arm first face defines a portion of said bottom wall means and said second arm second face defines a portion of said second side wall means, and an operative position, in which said second pivoting arm is rotated substantially 90 degrees inside said containment box means at said second material compaction station from said second pivoting arm idle position.

4. Machine according to claim 3, wherein said containment box means further comprises an upper curved wall means arranged at said second compaction station, said second pivoting arm having a free end which closely follows said upper curved wall means upon the rotation of said second arm means.

5. Machine according to claim 3, wherein said advancement means comprise a pivoting portion of said containment box means which is arranged upstream of said compaction stations along said material feed direction, said pivoting portion of said containment box being controllably oscillable by means of third fluid-actuated cylinder means with respect to said lower wall means of said containment box means with a reciprocating motion about an axis arranged transversely to said material feed direction for the intermittent advancement of the material through said compaction stations toward said cutting means.

6. Machine according to claim 3, wherein said pivoting portion has, on its side which is directed toward said compaction stations, a lip, said lower wall means of said containment box means defining a curved portion at said first compaction station, said lip being slidable along said curved portion, said lip defining a shoulder for pushing the material through said compaction stations.

7. Machine according to claim 5, wherein said pivoting portion has an amplitude of oscillation, said amplitude of oscillation being adjustable.

8. Machine according to claim 3, wherein said cutting means comprise guillotine shears.

9. Machine for compacting and cutting residual material, in particular for scrap metal, comprising:
containment box means for the material to be compacted, said containment box means defining a longitudinal extension corresponding to a material feed direction along which the material is advanced,
material advancement means for advancing the material in said containment box means along said material feed direction,
material compacting means for compacting the material in said containment box means,
material cutting means for cutting the compacted material, said material cutting means acting along a transverse direction with respect to said material feed direction, said material cutting means being arranged downstream from said material compacting means with respect to said material feed direction,
a cutting inlet being defined between said material cutting means and said material compacting means through which compacted material advances from said material compacting means to said material cutting means,
wherein said material compacting means comprise at least two material compaction stations being arranged in succession along said longitudinal extension of said containment box means, said at least two material compaction stations comprising a first material compaction station and a second material compaction station, said first material compaction station being arranged upstream of said second material compaction station with respect to said material feed direction, said first material compaction station comprising a first presser element, said second material compaction station comprising a second presser element, said first presser element comprising a first pivoting arm defining a first arm first face and a first arm second face, said second presser element comprising a second pivoting arm defining a second arm first face and a second arm second face, said containment box means comprising a first side wall means, a second side wall means, and a bottom wall means, said first side wall means and said second side wall means being arranged mutually opposite to each other and said bottom wall means extending and being connected therebetween, said first pivoting arm defining a free end being pivoted around a first pivoting axis which is substantially coplanar to said bottom wall means of said containment box means and which is substantially parallel to said material feed direction, said second pivoting arm defining a free end being pivoted around a second pivoting axis which is substantially coplanar to said bottom wall means of said containment box means and which is substantially parallel to said material feed direction, said machine further comprising firs fluid-actuated cylinder means for rotating said first pivoting arm around said first pivoting axis between an idle position, in which said first arm first face defines a portion of said bottom wall means and said first arm second face defines a portion of said first side wall means, and an operative position, in which said first pivoting arm is rotated substantially 90 degrees inside said containment box means at said first compaction station from said first pivoting arm idle position, said machine further comprising second fluid-actuated cylinder means for rotating said second pivoting arm around said second pivoting axis between an idle position, in which said second arm first face defines a portion of said bottom wall means and said second arm second face defines a portion of said second side wall means, and an operative position, in which said second pivoting arm is rotated substantially 90 degrees inside said containment box means at said second compaction station from said second pivoting arm idle position, and wherein said containment box means has a parallelepipedal configuration at said compaction stations, said first pivoting arm being a first substantially L-shaped pivoting arm, said second pivoting arm being a second substantially L-shaped pivoting arm.

* * * * *